Dec. 9, 1924.
S. B. SMITH
LOCK WASHER
Filed Oct. 25, 1923
1,519,066
Fig.1,
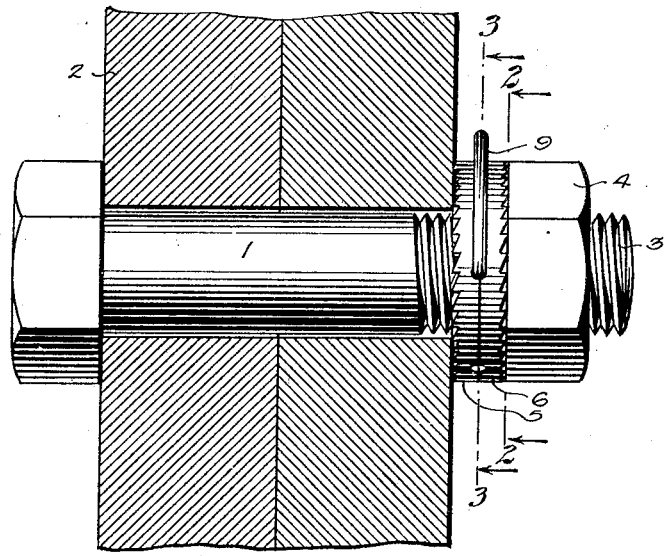
Fig.2,
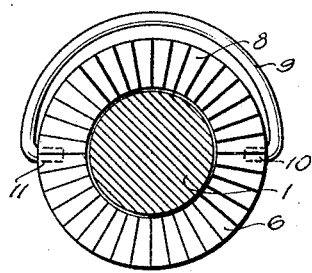
Fig.3.
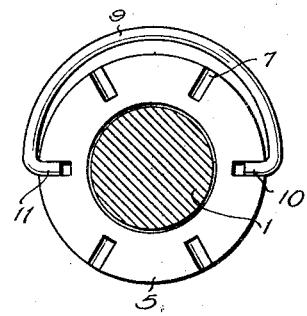
WITNESSES
Edw. Thorpe
Robert J. Hulsizer
INVENTOR
Samuel Burton Smith
BY Munn & Co
ATTORNEYS Patented Dec. 9, 1924.

1,519,066

UNITED STATES PATENT OFFICE.

SAMUEL BURTON SMITH, OF BROOKLYN, NEW YORK.

LOCK WASHER.

Application filed October 25, 1923. Serial No. 670,781.

*To all whom it may concern:*

Be it known that I, SAMUEL BURTON SMITH, a citizen of the United States, and a resident of the city of New York, borough of Brooklyn, in the county of Kings and State of New York, have invented a new and Improved Lock Washer, of which the following is a full, clear, and exact description.

This invention relates to a lock washer construction. An object of the invention is to provide a washer which can be readily slipped over the end of any standard type of bolt to simply and efficiently achieve the locking of a nut on the bolt.

Another object concerns the provision of a construction involving a minimum number of simple parts whereby the device will stand up under considerable and rough usage and in which the construction is such that the parts can be made relatively economically.

A further object concerns the provision of a construction which can be adapted to any type of bolt and nut and requires absolutely no alteration or modification of the usual bolt and nut construction.

The invention is illustrated in the drawings of which—

Figure 1 is a section taken through a support through which a bolt passes, showing the lock washer in place;

Fig. 2 is a section taken on the line 2—2 of Fig. 1; and

Fig. 3 is a section taken on the line 3—3 of Fig. 1.

The form of the invention shown in the drawings is a preferred form, although it is understood that modifications in the construction and arrangement of the parts and in the character of the materials used may be adopted without departing from the spirit of the invention as set forth in the appended claim.

In the preferred embodiment of the invention shown in the drawings, a bolt 1 passes through a support 2, the threaded end 3 of the bolt projecting on the other side of the support. A nut 4 of any standard type is threaded on the end of the bolt. In the ordinary operation the nut would bear against the surface of the support 2, and if the support were subjected to vibration or movement of any kind the nut would tend to work loose. In order to prevent this taking place, it is my intention to provide means disposed between the surface of the nut and the surface of the support to engage with the nut and the support and prevent the nut from working loose.

This invention comprises a lock washer formed of two elements 5 and 6 which are in the form of relatively flat washers adapted to abut, the abutting surfaces of these washers being smooth but each being preferably provided around the edges of their abutting surfaces with recesses such as 7 which are capable of being brought into registration with each other in the relative movement between the washers. The opposite faces of the washers are roughened, as at 8, preferably by being provided with a series of teeth. These toothed washers are preferably case hardened so that they effectively bite into any surface against which they bear. In actual operation the two washers are slipped over the end of the bolt with their smooth surfaces abutting each other, and as the nut 4 is threaded on the end of the bolt it will gradually begin to bear on the toothed surface of one of the washers, such as 6. Rotation of the nut will advance it and press the two washers together. This will force the toothed surface of the other washer to bite into the surfaces of the support 2. Because the abutting surfaces of the washers are smooth there will tend to be a relative rotation between them, and as the nut advances there will be a time in the slight rotation between the washers when the grooves 7 in each of the abutting surfaces of the washers will be alined. When such a registration takes place and the nut is advanced sufficiently far, then a spring member 9 having inwardly projecting ends 10 and 11 is passed around the edges of the washers so that the ends 10 and 11 will project into any two pairs of registering slots or recesses, and because the ends of the spring member are of a size sufficient to fill the openings formed by the registration of the recesses 7, any relative movement of the washers in either direction will be prevented.

In this assembled position the inner washer bites firmly into the surface of the support. The outer washer is locked securely with relation to the inner washer, and the under surface of the nut is securely bitten into by the toothed surface of the other washer. In this respect, therefore, the parts are firmly locked so that any movement which would tend to loosen the parts is effectively prevented.

It will be observed that the provision of this lock washer construction does not require in any way the modification of the construction of the bolt, the nut or the support, and, therefore, the washer construction is adapted to operate in connection with any of the standard bolt and nut constructions.

What I claim is:—

A lock washer construction which comprises a pair of washers having relatively smooth abutting surfaces provided with a plurality of grooves adapted to be brought into registration with each other, the opposite surfaces of the washers being provided with teeth, said toothed surfaces being case hardened and adapted to bite respectively into the surface of a support and into the under surface of a nut, and a spring element having inwardly projecting ends, said ends adapted to project into certain of the registering grooves on the washers to hold the washers in fixed relation to each other.

SAMUEL BURTON SMITH.